United States Patent [19]

Gunnerson et al.

[11] Patent Number: 4,595,595
[45] Date of Patent: Jun. 17, 1986

[54] PROCESS FOR SIMULTANEOUS ROASTING OF NUTMEATS AND PELLICLE REMOVAL

[75] Inventors: Robert E. Gunnerson, Manteca; Gary Jue, Fresno, both of Calif.

[73] Assignee: Sun-Diamond Growers of California, Stockton, Calif.

[21] Appl. No.: 690,568

[22] Filed: Jan. 10, 1985

Related U.S. Application Data

[63] Continuation-in-part of Ser. No. 523,812, Aug. 15, 1983, abandoned.

[51] Int. Cl.$^4$ .............................................. A23L 1/36
[52] U.S. Cl. .................................. 426/438; 426/469; 426/483; 426/484
[58] Field of Search ............. 426/438, 441, 482, 483, 426/598, 288, 309, 466, 469, 632, 484

[56] References Cited

U.S. PATENT DOCUMENTS

| | | | |
|---|---|---|---|
| 1,438,467 | 12/1922 | Walden | 426/438 |
| 1,664,334 | 3/1928 | Thompson et al. | 426/482 |
| 1,908,059 | 5/1933 | Sawin | 426/438 |
| 2,995,166 | 8/1961 | Burley et al. | 146/227 |
| 3,077,217 | 2/1963 | Hind | 426/482 |
| 3,269,442 | 8/1966 | Gardner | 426/483 |

*Primary Examiner*—R. B. Penland
*Attorney, Agent, or Firm*—Townsend and Townsend

[57] ABSTRACT

A process for the removal of pellicle from nut kernels is disclosed which simultaneously roasts the nuts. The process involves immersing the pellicle-covered kernels in a heated fluid at a moderate temperature for a sufficient period of time to permit the oil to penetrate the pellicle and to draw at least a portion of the moisture in the kernel to the kernel surface. The kernels are then heated at a higher termperature to vaporize the moisture previously drawn up to the surface and simultaneously detach the pellicle from the kernels and roast the kernels. The process is of particular utility in removing pellicle from nuts such as American hazelnuts and Brazil nuts in which the pellicle is strongly bound to the kernels and not readily removed by simple abrasion.

13 Claims, No Drawings

PROCESS FOR SIMULTANEOUS ROASTING OF NUTMEATS AND PELLICLE REMOVAL

CROSS-REFERENCE TO RELATED APPLICATION

This application is a continuation-in-part of copending application Ser. No. 523,812, filed Aug. 15, 1983 now abandoned.

BACKGROUND OF THE INVENTION

1. Field of the Invention

This invention relates to the processing of nuts, and in particular to both the removal of the pellicle from nut kernels and the roasting of the kernels.

2. Description of the Prior Art

The removal of pellicle from nut kernels is an important step in the processing of many varieties of nutmeats. The pellicle is the thin skin encircling the kernel (or endosperm). By removing pellicle, one enhances the character of the nutmeats for a variety of reasons, including facilitating the addition of flavorings or coatings, dicing, forming the kernel into nut paste or nut butter, and generally improving the pleasure of eating the shelled nuts out of hand.

Pellicle is comprised largely of cellulose in combination with a number of minor constituents present in differing amounts from one nut variety to the next. In some varieties, these minor constituents cause the pellicle to be tightly affixed to the kernel and difficult to remove. This is a particularly acute problem, for example, in Brazil nuts and American varieties of hazelnuts, more so in fact than in European hazelnut varieties. Known methods for removing such pellicle involve harsh chemical or physical treatments which either damage the kernels or detract from the taste. The chemical treatments generally involve an immersion in caustic soda or other alkaline solution, followed by an acid neutralization. Examples of such processes are disclosed in Stagmeier, U.S. Pat. No. 2,156,406, May 2, 1939, and Edes, U.S. Pat. No. 2,273,183, Feb. 17, 1942. These treatments are detrimental to the flavor of the final product and result in kernels of unnatural color. An example of a physical treatment is disclosed in Schoolcraft, U.S. Pat. No. 2,651,345, Sept. 8, 1953. This involves the use of a high pressure water spray to remove the pellicle, and is also used in conjunction with chemical treatments. In order to be effective, however, the physical treatment is so strong that it often results in physical damage to the kernel itself and still results in a nonuniform product due to incomplete pellicle removal. Such treatment may also result in emulsification or saporification of the outer layers of the oil-bearing endosperm. Furthermore, such treatment has a high energy consumption and requires expensive equipment.

SUMMARY OF THE INVENTION

A process for the removal of pellicle from nut kernels is provided which overcomes many of the disadvantages of the prior art. The process involves immersing the pellicle-covered kernels in a heated fluid at a temperature less than or equal to about 235° F. for a sufficient period of time to draw at least a portion of the moisture in the kernel up to the kernel surface. This is followed by heating the pellicle-covered kernels at a substantially higher temperature to rapidly vaporize substantially all of the moisture in the surface region and simultaneously detach the pellicle from the kernels. The high temperature heating further effects a light roasting of the kernels as the pellicle is being detached. The kernels are then loosely encircled by the detached pellicle with substantially no adhesive binding between the two. The pellicle material is then readily separated from the kernels by simple abrasion, releasing the whole kernels from the pellicle to form a mixture of pellicle fragments and kernels from which the kernels are easily recovered.

The fluid in the first step may be water or oil. In preferred embodiments, oil is used both as the fluid in the first step and the heating medium in the second step. Such preferred practice differs from common hot oil roasting techniques by the inclusion of the initial, low temperature step which permits penetration of the pellicle by the oil as well as the release of moisture from the interior of the kernel, all before roasting takes place. The process efficiently provides uniform pellicle-free kernels of pleasing appearance and mouth feel, suitable for further processing if desired.

DESCRIPTION OF THE SPECIFIC AND PREFERRED EMBODIMENTS

The present invention is applicable to all pellicle-covered nuts. It is of particular utility, however, to those nuts whose pellicle is tightly affixed to the kernel or endosperm and are not capable of removal by simple abrasion. Examples of these are the two varieties of American hazelnuts (*Corylus americana* and *Corylus rostrata*) and the Brazil nut (*Bertholletia excelsa*), and cultivars thereof.

The process is applicable only to nuts having a significant quantity of moisture retained in the kernel. The quantity of moisture is not critical and can vary over a wide range. The primary considerations are that there be sufficient moisture to prevent overroasting or burning and to permit an effective amount to be drawn toward the surface during the slow heating step, while still low enough that the final product will have a hard crunchy character. In most applications, a moisture content of at least about 0.5% by weight, preferably with the range of about 3% to about 15% by weight, and most preferably from about 5% to about 10% by weight will provide the best results. In many cases, the natural moisture content will be sufficient. Excessive moisture can be removed if necessary by conventional processing techniques prior to the pellicle removal.

The slow heating step is done in any manner which will permit fluid contact and apply heat to the exterior of the kernels in a controlled uniform manner. This is done by immersion of the pellicle-covered kernels in a temperature-controlled water or oil bath, preferably edible oil. The preferred oils are vegetable oils, notably soybean, cottonseed, coconut, corn, peanut, sesame, olive, and palm oils, and mixtures thereof. The oils are preferably in hydrogenated form, or treated in some equivalent manner to prolong their useful life.

Heating in this initial step is done to a sufficient degree to permit penetration of the pellicle by the heating fluid, yet without roasting the kernel. During this step, at least a substantial portion of the substances binding the pellicle to the kernel are dissolved in the fluid, and some of the moisture residing in the bulk of the kernel is drawn to the region at the kernel surface beneath the pellicle, preferably to cover the entire surface region surrounding the kernel. The immersion temperature and contact time may vary, with higher temperatures generally appropriate for shorter times. The best results in this step are generally achieved by drawing only a portion of the moisture to the surface. In most situations this will help in avoiding overroasting in the subsequent process steps, and the final result will be a product of pleasing taste and mouth feel. In general, a temperature less than or equal to about 235° F. (113° C.) will provide the best results. In the treatment of American hazelnut varieties, the preferred temperature is from about 205° F. to about 210° F. (96° C. to 99° C.), and the contact time is preferably from about 8 to about 10 minutes. The optimum bath temperature and immersion time for any given system is readily determined by routine experimentation.

In the preferred practice of the invention, the pellicle-covered kernels are drained of excess oil after the slow heating step, and permitted to stand for a short time under ambient conditions to reach an equilibrium state. This permits the further withdrawal of moisture from the bulk of the kernel to the surface without the danger of roasting due to continued contact with the heated oil. The waiting period also permits the absorbed oil to diffuse uniformly throughout the bulk of the kernel. Equilibrium is readily achieved by permitting the pellicle-covered kernels to cool to room temperature as the surface oil drains off.

The second heating step may be accomplished in any manner capable of rapidly raising the temperature of the kernels. This is preferably done in the same manner as the first heating step but at a higher temperature. The purpose in this step is to rapidly vaporize the moisture at the surface regions of the kernel. Upon immersion of the kernels in the hot bath, both the moisture and the cool oil escape the surface regions and the pellicle is displaced from the kernel, which remains encircled by the pellicle but fully detached therefrom.

The second heating step is preferably done at a temperature sufficiently high to cause rapid, almost explosive, vaporization of the surface moisture to enhance the pellicle separation, yet without significant overroasting of the kernels. The optimum temperature and time to achieve these results are also readily determined by routine experimentation, and may vary depending on the desired quality of the final product. It is generally preferred that the temperature be high enough to avoid an oily or soggy nutmeat upon final processing, yet low enough to prevent burning. A temperature within the range of about 340° F. to about 360° F. (171° C. to 182° C.) will generally provide the best results. Likewise, an immersion time of about 1 to about 3 minutes is preferred.

At this point in the processing, the kernels are loosely encircled by pellicle, and the latter are readily removed by simple abrasion, preferably in the form of a tumbling or light shearing action. For improved efficiency in the overall processing of the kernels, the abrasion is preceded by draining the kernels of oil and at least a partial cooling. This conserves the oil and insures that the finished nut kernels at the end of the production line are cool enough for immediate packaging. Cooling to a temperature below about 180° F. (82° C.), preferably to a temperature of from about 120° F. to about 180° F. (49° C. to 82° C.), will provide the best results.

Abrasion is then done according to conventional means. Any method or apparatus which will abrade the pellicle-clad kernels sufficiently to dislodge or break up the pellicle without doing substantial physical damage to the kernels can be used. A rolling drum is particularly convenient when used at a rotation rate capable of imparting a tumbling action and a gentle shear of the kernels against the inner walls of the drum. The axis of the drum may be inclined to promote continuous processing, and may incorporate numerous other design features which will be readily apparent to those skilled in the art. Abrasion is continued until the pellicle is fully separated from the kernels, resulting in a mixture of whole kernels and pellicle fragments. Kernel recovery from this mixture is then accomplished by conventional means. A particularly convenient and effective method is the use of a stream of air directed against the falling mixture in a transverse direction with sufficient force to divert the low density pellicle fragments from the heavier kernels, yet gentle enough to permit the kernels to continue their fall.

The foregoing description is offered solely for purposes of illustration, and it should be understood that the present invention is not intended to be limited to either the specific materials, structures, or procedures herein disclosed. It will be readily apparent to those skilled in the art that numerous modifications and variations of the above can be made while still falling within the spirit and scope of the invention as claimed hereinbelow.

What is claimed is:

1. A process for the removal of pellicle from pellicle-covered nut kernals having at least about 0.5% moisture by weight, said process consisting essentially of:
   (a) slowly heating said pellicle-covered kernels by immersion in a heated oil at a temperature less than or equal to about 235° F. for a contact time sufficient to draw at least a portion of said moisture from the body of said kernels to the surface thereof beneath said pellicle,
   (b) rapidly heating said pellicle-covered kernels to a temperature of 340° to 360° F. substantially higher than the temperature of step (a) to vaporize substantially all of said moisture from said surface regions and detach said pellicle from said kernels,
   (c) abrading said pellicle-covered kernels to form a mixture comprising pellicle fragments and pellicle-free kernels, and
   (d) recovering said pellicle-free kernels from said mixture.

2. A process according to claim 1 in which said nut kernels are shelled nuts selected from the group consisting of *Corylus americana, Corylus rostrata, Bertholletia excelsa,* and cultivars thereof.

3. A process according to claim 1 in which step (b) is accomplished by immersion of said kernels in a heated vegetable oil.

4. A process according to claim 1 in which the moisture level of said nut kernels is from about 3% to about 15% by weight.

5. A process according to claim 1 in which the moisture level of said nut kernels is from about 7% to about 10% by weight.

6. A process according to claim 1 further comprising draining and cooling said pellicle-covered kernels to approximately ambient temperature between steps (a) and (b).

7. A process according to claim 1 in which steps (a) and (b) are each accomplished by immersion of said kernels in a heated vegetable oil.

8. A process according to claim 1 in which steps (a) and (b) are each accomplished by immersion of said kernels in a heated hydrogenated vegetable oil.

9. A process according to claim 1 further comprising cooling said pellicle-covered kernels to a temperature below about 180° F. between steps (b) and (c).

10. A process according to claim 1 in which the oil temperature of step (a) is from about 205° F. to about 210° F. and the contact time is from about 8 to about 10 minutes.

11. A process according to claim 1 in which step (b) is accomplished by immersing said kernels in an edible oil at a temperature of from about 340° F. to about 360° F. for from about 1 to about 3 minutes.

12. A process for the removal of pellicle from pellicle-covered kernels of nuts selected from the group consisting of *Corylus americana, Corylus rostrata, Bertholletia excelsa* and cultivars thereof having a moisture content of from about 5% to about 10% by weight, said process consisting essentially of:

(a) slowly heating said pellicle-covered kernels by immersion in a vegetable oil at a temperature less than or equal to about 235° F. for a contact time of sufficient duration to draw only a portion of said moisture from the body of said kernels to the region of each said kernel at the surface thereof beneath said pellicle, with substantially no roasting of said kernels, (b) draining and cooling said pellicle-covered kernels to approximately ambient temperature, (c) rapidly heating said pellicle-covered kernels by immersion in a vegetable oil at a temperature of from about 340° F. to about 360° F. to vaporize substantially all of said moisture from said surface regions and detach said pellicle from said kernels, (d) draining and cooling said pellicle-covered kernels to a temperature below about 180° F., (e) abrading said pellicle-covered kernels to form a mixture comprising pellicle fragments and pellicle-free kernels, and (f) recovering said pellicle-free kernels from said mixture.

13. A process for the simultaneous roasting and removal of pellicle from pellicle-covered kernels of nuts selected from the group consisting of *Corylus americana, Corylus rostrata, Bertholletia excelsa* and cultivars thereof having a moisture content of from about 5% to about 10% by weight, said process consisting essentially of :

(a) slowly heating said pellicle-covered kernels by immersion in a vegetable oil at a temperature of from about 205° F. to about 210° F. for from about 8 to about 10 minutes.

(b) draining and cooling said pellicle-covered kernels to approximately ambient temperature, (c) rapidly heating said pellicle-covered kernels by immersion in a vegetable oil at a temperature of from about 350° F. to about 360° F. for from about 1 to about 3 minutes, (d) draining and cooling said pellicle-covered kernels to a temperature below about 180° F., (e) abrading said pellicle-covered kernels to form a mixture comprising pellicle fragments and pellicle-free kernels, and (f) recovering said pellicle-free kernels from said mixture.

* * * * *